J. C. DUCKWORTH.
KEY FOR ROTARY ELEMENTS.
APPLICATION FILED FEB. 11, 1913.
1,103,403.
Patented July 14, 1914.
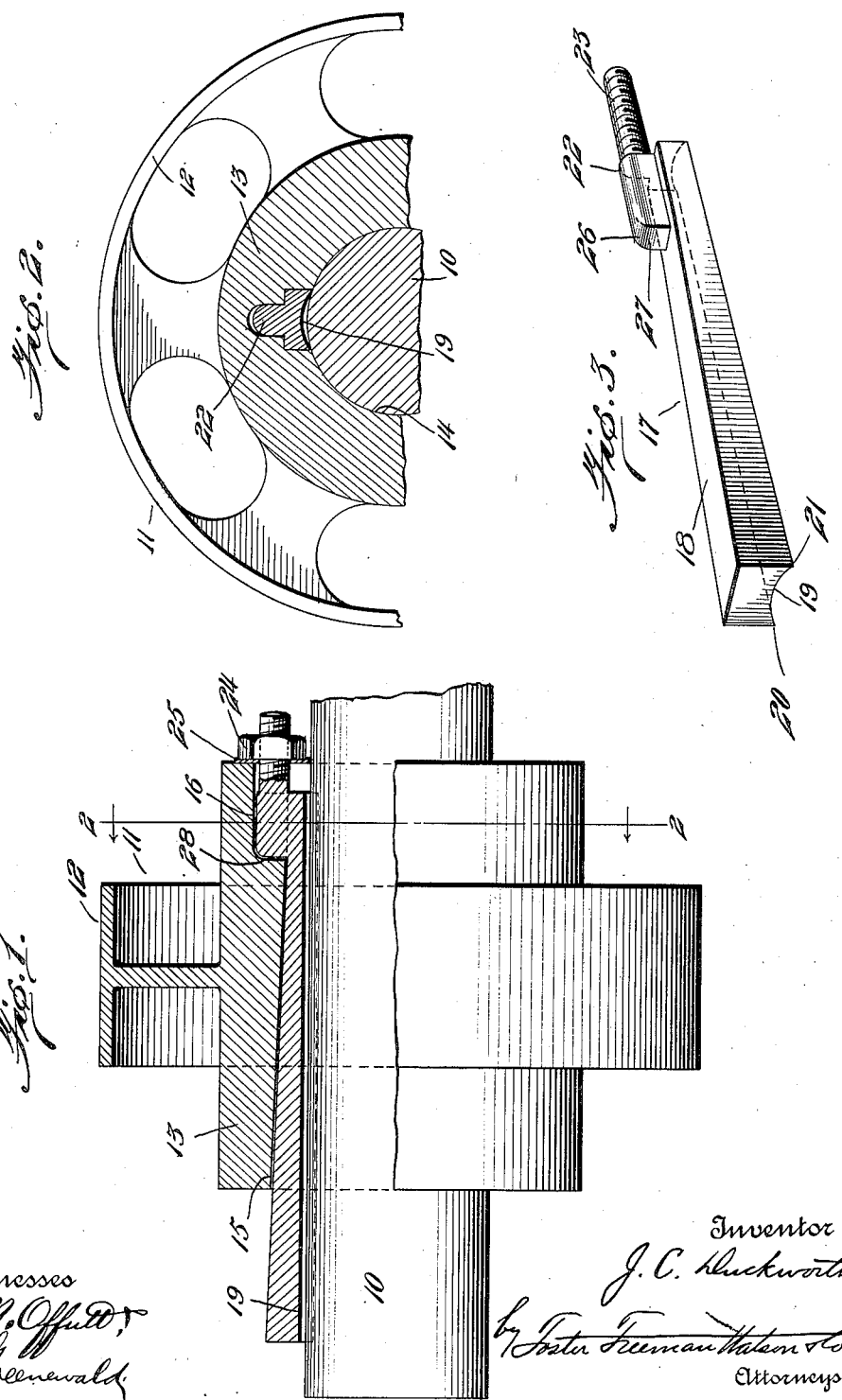

UNITED STATES PATENT OFFICE.

JOSEPH C. DUCKWORTH, OF WILLIAMSTON, SOUTH CAROLINA.

KEY FOR ROTARY ELEMENTS.

1,103,403. Specification of Letters Patent. Patented July 14, 1914.

Application filed February 11, 1913. Serial No. 747,700.

*To all whom it may concern:*

Be it known that I, JOSEPH C. DUCKWORTH, a citizen of the United States, residing at Williamston, county of Anderson, State of South Carolina, have invented certain new and useful Improvements in Keys for Rotary Elements, of which the following is a specification.

This invention relates to devices for securing pulleys, gears and the like to shafts.

The invention has for its object to provide an inexpensive and efficient coupling means whereby the pulley or gear may be fastened to the shaft without requiring a keyseat in the shaft and without the use of set screws.

A further object is to provide an arrangement whereby the pulley or gear may be readily unfastened and moved to any position on the shaft.

Other objects and the novel features of the invention will be apparent from the following description taken in connection with the drawing in which:—

Figure 1 is a view partly in section and partly in elevation showing a pulley and shaft, and a coupling means embodying my invention. Fig. 2 is a section along the line 2—2 of Fig. 1. Fig. 3 is a perspective view of the key or fastening device.

Referring to the drawing, 10 designates a shaft which supports the pulley 11, it being understood however that the use of the fastening means is not limited to pulleys. The pulley 11 comprises a rim 12 connected to and supported concentrically with a hub 13 having a bore 14 of a size sufficient to take the shaft 10 and being of somewhat greater length than the width of the face of the pulley so as to afford a more extensive engagement between the pulley fastening means and shaft, however the proportions may be varied as desired. Longitudinally of the hub bore there is a longitudinally inclined key seat 15 to take the fastening means. The seat is rectangular in cross section and is enlarged at one end as at 16 for a purpose to be explained.

The key or coupling device 17 comprises a tapering bar the upper or flat face 18 of which is inclined the same degree as the recess 15 in the bore and slides and securely seats therein. The opposite face 19 of the key is grooved or transversely curved throughout its entire length, the radius of curvature of the face being considerably less than that of the shaft whereby the shaft is engaged by the longitudinal edges 20, 21 of the curved surface 19. By such an arrangement the key 17 will have a tendency to bite the shaft when drawn up and consequently will be securely held in place. At its narrow end, the tapering key has an offset part 22 which is threaded as at 23 to receive the nut 24 the offset part 22 being disposed parallel to the shaft 10 and far enough from the same so that the nut 24 will clear the shaft when it is turned to draw the wedge shaped key 17 into place. The nut bears against the washer 25 which fits over the threaded end 23 and lies against the hub 13.

The enlarged part 16 of the keyway in the hub constitutes a countersink or recess to take the shank 26 of the offset part of the key, which shank is of less width and preferably integral with and connected to the flat inner face 18 of the key.

The key 17 is set in the tapering part of the groove in the pulley, the shoulder 27 formed by the offset engaging against the shoulder 28, formed by the enlargement of the recess. The pulley or gear is then set on the shaft and the key is drawn along the shaft by tightening the nut 24, the edges of the curved part engaging the shaft and the inclined key 17 wedging the inclined keyway 15 and the shaft. The tapering key and offset portion at the end thereof respectively fit in the tapering portion of the key seat and the recess at the shallow end of the latter whereby when the parts are fitted together the movement of the key longitudinally of the shaft in either direction will be limited.

Having thus described my invention, what is claimed is:

The combination of a shaft, an element having a bore adapted to receive said shaft, and means for securing the element to said shaft comprising a tapering key having an offset part at its narrow end, said bore having a longitudinal tapering keyseat and a recess at the shallow end of said keyseat adapted to receive said key and the offset portion thereof respectively to limit the movement of said key longitudinally of said shaft in either direction.

In testimony whereof I affix my signature in presence of two witnesses.

JOSEPH C. DUCKWORTH.

Witnesses:
L. H. TOLLISON,
J. B. HUDGENS.